United States Patent
Takanashi

(10) Patent No.: US 6,317,273 B1
(45) Date of Patent: Nov. 13, 2001

(54) LENS BARREL APPARATUS

(75) Inventor: Tatsuo Takanashi, Hachioji (JP)

(73) Assignee: Olympus Co., Ltd., Tokyo (JP)

( * ) Notice: Subject to any disclaimer, the term of this patent is extended or adjusted under 35 U.S.C. 154(b) by 0 days.

(21) Appl. No.: 09/526,666

(22) Filed: Mar. 15, 2000

(30) Foreign Application Priority Data

Mar. 19, 1999 (JP) .................................................. 11-076718

(51) Int. Cl.$^7$ .................................................. G02B 15/14
(52) U.S. Cl. .......................................... 359/699; 359/704
(58) Field of Search ..................................... 359/699, 700, 359/703, 704, 823, 818

(56) References Cited

U.S. PATENT DOCUMENTS

| | | | |
|---|---|---|---|
| 4,322,151 | * 3/1982 | Weiss | 396/72 |
| 4,989,950 | * 2/1991 | Nakauchi | 359/818 |
| 5,216,549 | 6/1993 | Notagashira et al. | 359/703 |
| 5,586,467 | * 12/1996 | Weber | 74/57 |
| 5,805,353 | * 9/1998 | Ichino et al. | 359/699 |

FOREIGN PATENT DOCUMENTS

| | | |
|---|---|---|
| 4-125605 | 4/1992 | (JP) . |
| 10-177130 | 6/1998 | (JP) . |

\* cited by examiner

*Primary Examiner*—Ricky Mack
(74) *Attorney, Agent, or Firm*—Frishauf, Holtz, Goodman, Langer & Chick, P.C.

(57) ABSTRACT

A lens barrel apparatus according to the present invention incorporates a cam cylinder serving as a lens barrel having cam grooves for moving frame. Spring portions serving as spring means for making predetermined holding force are formed adjacent to the cam grooves to cause the cam grooves to pinch the cam followers. The cam grooves are continuous grooves or openings formed in the surface adjacent to the cam cylinder. The spring portions are constituted by a plurality of openings formed adjacent to the cam grooves. The lens barrel apparatus exhibiting a simple structure having the small number of elements can be operated by a structure constituted by a cam and a cam follower free from any looseness.

18 Claims, 4 Drawing Sheets

LENS BARREL APPARATUS

CROSS-REFERENCE TO RELATED APPLICATIONS

This application is based upon and claims the benefit of priority from the prior Japanese Patent Application No. 11-076718, filed Mar. 19, 1999, the entire contents of which are incorporated herein by reference.

BACKGROUND OF THE INVENTION

The present invention relates to a slide guide structure incorporating a cam groove and a cam follower, and more particularly to a lens barrel apparatus having the foregoing structure.

In recent years, zoom lenses of a type arranged to change the distance between lenses to continuously change the focal distance have widely been employed. A lens moving apparatus has been disclosed in, for example, Jpn. Pat. Appln. KOKAI Publication No. 4-125605. The apparatus incorporates a spring member causing a cam surface and a cam follower surface to be brought into contact with each other so that "looseness" is prevented.

A molded plastic element and a slide guide structure disclosed in Jpn. Pat. Appln. KOKAI Publication No. 10-177130 constitute a dual structure consisting of first and second molded elements constituted by the molded plastic element and formed into cylindrical shape. Moreover, a spiral cam groove is formed in the inner surface of the structure. Thus, looseness can be prevented when the cam follower slides along the cam groove.

The lens moving apparatus disclosed in Jpn. Pat. Appln. KOKAI Publication No. 4-125605 must have the additional spring. Also the assembling process must have a step for assembling the spring. Therefore, the productivity deteriorates.

The slide guide structure disclosed in Jpn. Pat. Appln. KOKAI Publication No. 10-177130 is able to moderate the looseness owing to the elasticity of the molded plastic element. The dual structure causes the number of molded elements and assembling steps to be increased.

Moreover, a specific method of moving the lens has not been described in both of the conventional techniques. In addition, no description has been made about the operation permitted by the disclosed structure.

When the performance of a photographing lens is improved, a complicated structure is required because the number of the elements is increased. Thus, the size of the structure cannot be reduced. When the lens is slid, the degree of deflection varies in the sliding stroke. Therefore, a uniform state of contact cannot completely be maintained, causing "looseness" to occur. Hence it follows that smooth movement is inhibited. Moreover, the state of contact cannot be maintained at the stop position due to external force or excessive vibrations. As a result, stable holding of the lens is sometimes inhibited.

In view of the foregoing, an object of the present invention is to realize a mechanism for a lens barrel apparatus having a simple structure, incorporating a small number of elements and permitted to be operated without any looseness by a structure having a cam and a cam follower.

BRIEF SUMMARY OF THE INVENTION

To achieve the object, the present invention has the following means. That is, a lens barrel apparatus according to the present invention incorporates a holding frame for holding a lens; a frame member for moving the holding frame in the direction of the optical axis of the lens; and a spring portion integrally formed with the frame member to urge the holding frame.

Specifically, the lens barrel apparatus comprises: a cam cylinder having a cam groove for moving a cam follower; and a spring portion disposed adjacent to the cam groove to cause the cam groove to make predetermined force for pinching the cam follower. The cam groove is a continuous groove or a continuous opening formed in the cam cylinder. The spring portion is constituted by a plurality of openings formed adjacent to the cam groove.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 2A and 2B show the shapes of the cam portion and the spring portion according to the first embodiment, in which FIG. 2A is a developed plan view showing the cam cylinder and FIG. 2B is a developed plan view showing a cam cylinder for holding the cam follower and a linear-movement cylinder;

DETAILED DESCRIPTION OF THE INVENTION

A plurality of embodiments of the present invention will now be described.

First Embodiment

Figure 1:
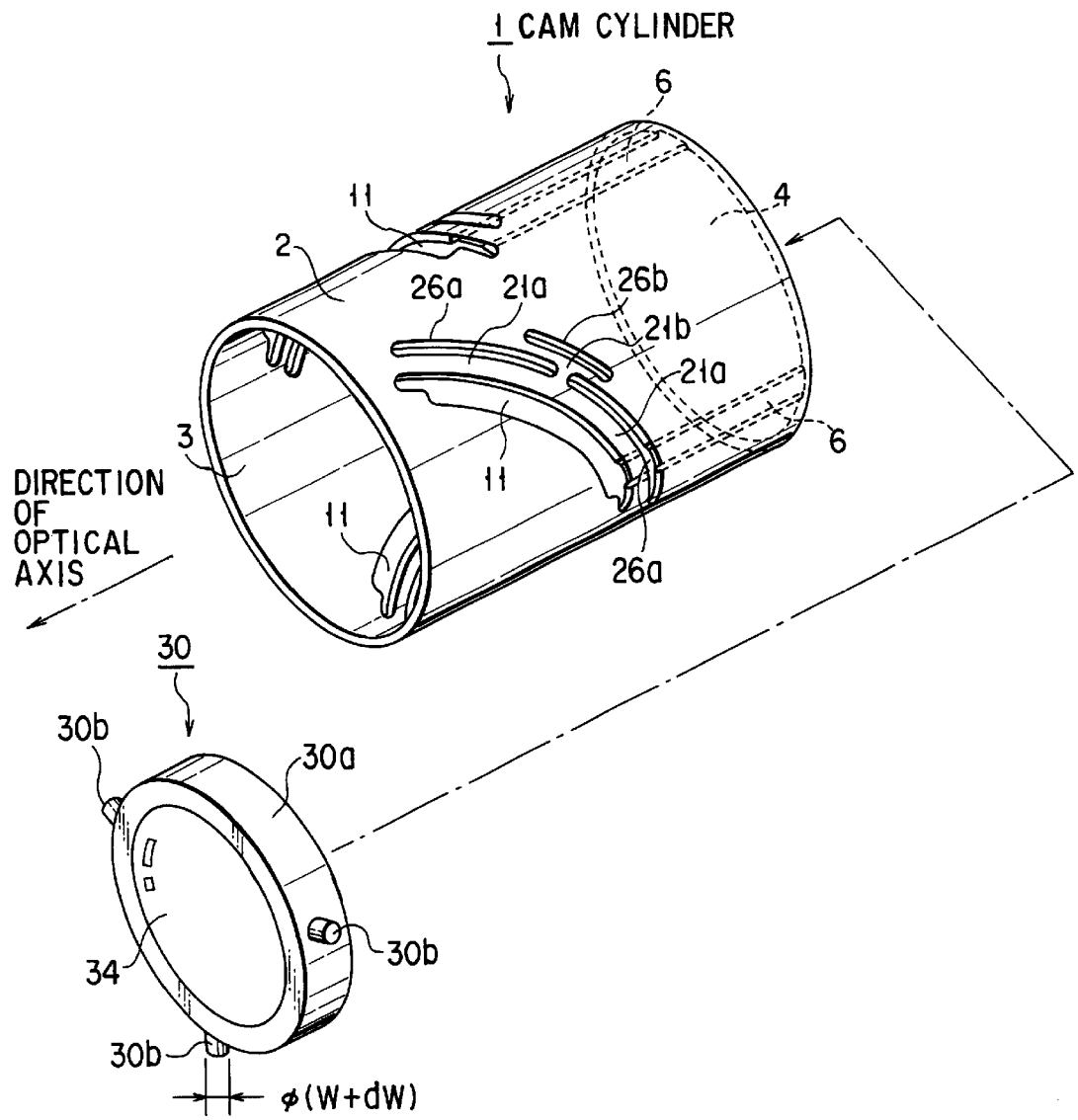
FIG. 1 is a perspective view showing a cam structure according to a first embodiment of the present invention in a state before a cam cylinder and a lens frame are mounted.
Figure 2A:
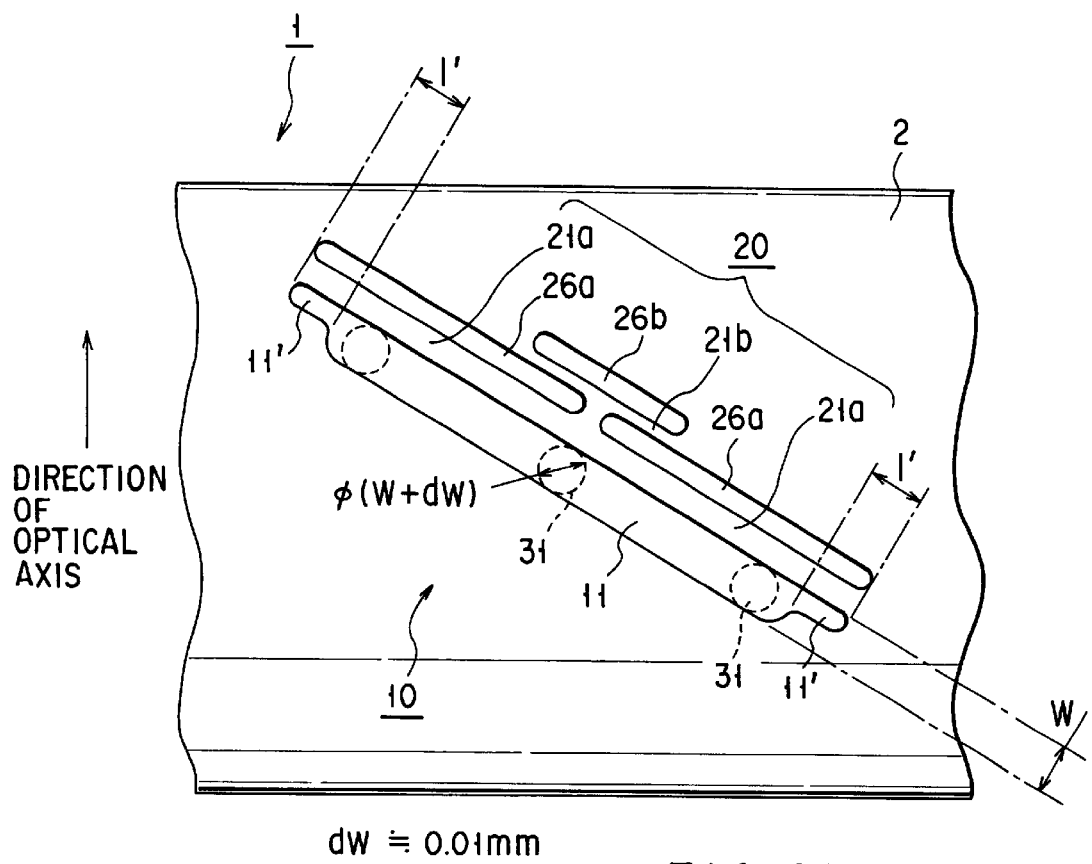
Figure 2B:
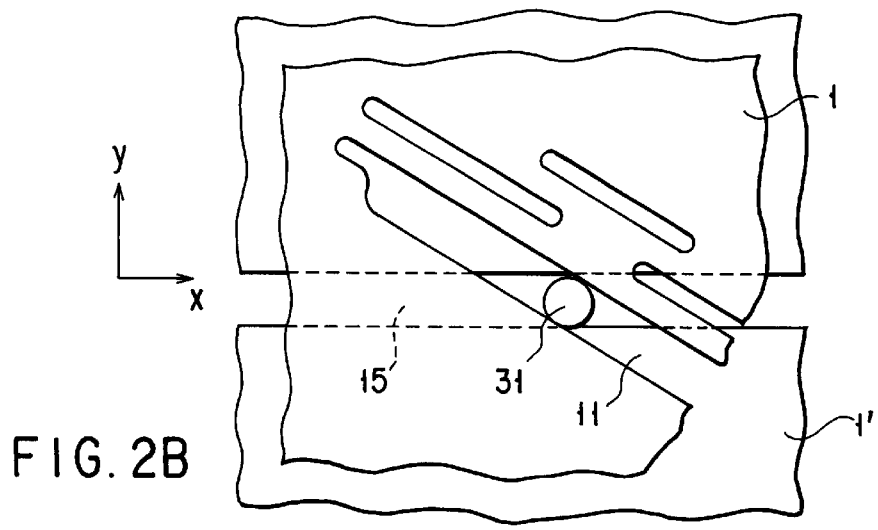

FIGS. 1, 2A and 2B shows the structure of a cam cylinder for a movable and magnification variable lens according to a first embodiment of the present invention. FIG. 1 shows the shape of the cam structure according to the first embodiment in a state before a lens frame 30 is mounted on a cam cylinder (frame member) 1 serving as a lens barrel.

As shown in the drawings, the cam cylinder 1 is made of synthetic resin (e.g. plastic resin). The cam cylinder 1 is a cam cylinder incorporating a lens frame 30 and a plurality of cam grooves 11 serving as cam means in which the lens frame 30 is inserted so as to be capable of sliding along the cam grooves 11. Specifically, the cam cylinder 1 is a lens barrel of a photographing optical system incorporating the three cam grooves 11 for moving the cam followers 30b. The three cam grooves 11 are formed into the same shape. Each of the cam grooves 11 has spring portions 20 (21a and 21b) serving as spring means (elastic means) acting as springs for exhibiting appropriate holding force for holding the corresponding cam follower 30b.

Each of the three cam grooves 11 is an opening formed in the surface of the cam cylinder 1. Each of the spring portions 20 is constituted by a plurality of openings 26a and 26b formed adjacent to each of the three cam grooves 11.

As illustrated, three guide grooves 6 for guiding insertion of the three cam followers 30b of the lens frame (e.g. a movable frame) 30 from an opening 4 of the cam cylinder 1 are formed in the inner surface 3 starting with the opening 4.

Note that the cam structure according to this embodiment is a "three-point support" type structure which is employed as an example. That is, the structure of the cam cylinder 1 is a small structure which supports the lens frame 30 at three points to permit smooth movement of the lens 34 without occurrence of any looseness. The cam cylinder 1 is a known cam cylinder having a simple structure and capable of realizing a lens barrel (a lens barrel apparatus) for a camera exhibiting excellent operability.

As illustrated, the three spiral cam grooves 11 are independently formed in the outer surface 2 of the cam cylinder 1 at positions apart from one another by an angular degree of 120° around the optical axis.

The lens frame 30 has the three cam followers 30b which are engaged to the three cam grooves 11 and slid along the same. The lens frame 30 is inserted into the opening 4 in such a manner that the lens frame 30 is supported at the three points of the inner surfaces of the three cam grooves 11. That is, a frame 30a is not in contact with the inner surface of the cam cylinder 1. The lens frame 30 is structured to perform parallel translation in the direction of the optical axis by a "linear movement cylinder" to be described later and the cam cylinder 1. Thus, the position of the lens frame 30 is changed on the optical axis.

The elongated spring portions 20 for exhibiting elasticity like a plate spring are formed in the surface adjacent to the three cam grooves 11. In this embodiment, the spring portions 20 incorporates two elongated first openings 26a sectioned at a position adjacent to the center of the cam grooves 11 and formed in parallel with the cam grooves 11. Moreover, the spring portions 20 incorporates a second opening 26b formed adjacent to the sectioned position such that the second opening 26b is formed in parallel with the cam groove 11 and having a relatively short length. Thus, predetermined elasticity can be exhibited. The spring portions 20 is constituted by a first spring portion 21a and a second spring portion 21b.

The lens frame 30 incorporates a frame 35 which holds the lens 34 for use to adjust the focal point. In this embodiment, smooth movement of the lens frame 30 in the direction of the optical axis is permitted by a structure that three cam grooves 11 for permitting the three cam followers 30a to be slid and cut portions having the shape and dimensions (to be described later) for exhibiting predetermined elasticity are provided for the cam cylinder 1 having a single structure. Thus, the elasticity of the portions along the three cam grooves 11 can be uniformed.

As described above, the cam cylinder is constituted by a single-structure which is a simple structure requiring a small number of elements. Thus, the frame 35 can be moved in the direction of the optical axis in cooperation with a linear-movement cylinder having a linear-movement groove (not shown). Moreover, when each cam follower is moved or fixed, the three cam grooves 11 and the three cam followers 30b are always pressed against one another. Therefore, a structure free from any gap and looseness can be formed.

In this embodiment, the cam cylinder 1 and the linear-movement cylinder having the linear-movement groove (not shown) are relatively rotated. In the foregoing case, the cam follower is fitted to the linear-movement groove of the linear-movement cylinder (not shown). Moreover, the cam follower is engaged to the corresponding cam groove. The width of the linear-movement groove may be a usual width. If the linear-movement groove has a width slightly larger than the diameter of the cam follower, the cam follower is always held at three points in the cam groove with the spring characteristic by either sliding surface of the linear-movement groove and the cam groove of the cam cylinder. Therefore, looseness of the lens frame 30 in the direction of the optical axis can be prevented.

Another structure may be employed in which the cam cylinder according to this embodiment is employed with respect to a cam follower of a lens frame which is moved along the cam groove and a rod member which is a guide member (not shown). Thus, a similar effect of preventing looseness in the direction of the optical axis can be obtained.

The foregoing effect can be obtained from a second embodiment to be described later.

A situation will now be considered in which the structure according to this embodiment is applied to a photographing optical system of a camera. The lens frame 30 mounted on the inside portion of the cam cylinder 1 which is the lens barrel is shifted along the optical axis of the lens frame 30 such that the parallel translation is, in the stroke, performed in the direction of the optical axis. When a user manually rotates the lens barrel to, for example, adjust (e.g. to perform focusing) the focal point, the lens 34 is moved in the direction of the optical axis to a position in front of the cam cylinder 1 which is the lens barrel. That is, the lens 34 is moved in such a manner that the focal point of the photographing optical system aligns to the position of the focal point. The foregoing simple structure can be used as a means for adjusting the focal point of a camera.

FIG. 2A shows the shapes of the cam portion 10 and the spring portions 20 according to the first embodiment. A cam groove 11 which is one of the three spiral cam grooves 11 and a portion in the vicinity of the cam groove 11 are illustrated in a plan view.

As illustrated, a cam groove portion 10 (including the cam grooves 11) formed to make a predetermined angle from the direction of the optical axis and spring portions 20 (the first spring portions 21a and 21b) formed in the surface adjacent to the cam grooves 11 are provided for surfaces 2 and 3 of the cam cylinder 1.

The surface (not shown) of the cam cylinder 1 apart from the foregoing surface of the cam cylinder 1 by a phase difference of 120° has a first spring portion 21a and a second spring portion 21b formed in the surface adjacent to the other cam grooves 11. Moreover, the surface of the cam cylinder 1 apart from the foregoing surface of the cam cylinder 1 by a phase difference of 120° has a first spring portion 21a and a second spring portion 21b formed in the surface adjacent to the other cam grooves 11.

The dimensions of each portion will now be described. The three cam followers 30b are formed into projecting cylindrical shapes. The outer diameter of the cam follower 30*b* is the same as the width (W) of each of the three cam grooves 11 or slightly larger than the width (W)(that is, W+dW). Therefore, when the three cam followers 30*b* are engaged to the three cam grooves 11, the cam followers 30*b* are pressed because the difference in the width (dW) is, for example, 0.01 mm to 0.005 mm. Thus, the three cam followers 30*b* always urges the spring portions 20 as the spring means (that is, the elastic means).

Moreover, an elongated cut portion is formed at each of the two ends 11' of each cam groove 11, the cut portion having a width which is about the half of the width of the cam groove 11 and a length 1' which is similar to the diameter of the cam follower 30*b*. Thus, the elasticity of the portion adjacent to the cut portion can be adjusted by modifying a mold for performing injection molding. As a result, a predetermined spring characteristic (that is, the elasticity) can easily be exhibited.

The widths of the elongated first opening 26*a* provided for the spring portion 20 and the second opening 26*b* formed adjacent to the first opening 26*a*, the first spring portion 21*a* and the second spring portion 21*b* enable appropriate elasticity to be exhibited with which occurrence of any looseness between the spring portions 20 and the cam followers can be prevented.

The cam structure according to this embodiment incorporates a lens frame 30 which is a movable frame which is moved in predetermined stroke ranges permitted by the three cam grooves 11; three cam followers 30*b* provided for the lens frame 30; a cam portion 10 incorporating the three cam grooves 11 arranged to be engaged to the cam followers 30*b* to move the lens frame 30 and serving as a cam mechanism means; and the spring portions 20 (that is, the first and second spring portions) formed integrally with the three cam grooves 11 and serving as an elastic means for forcibly sliding the cam followers 30*b* along the side wall of the cam portion 10. The elasticity (the spring characteristic) of the spring portions 20 can arbitrarily be adjusted by designing the shapes and layout of the plural openings formed adjacent to the three cam grooves 11. Thus, the shape of the cam structure is, for example, arranged as described above.

FIG. 2B is a developed plan view showing a state in which the cam cylinder 1 having the spring characteristic and the linear-movement cylinder 1' having no spring characteristic are overlaid to hold the cam followers 30*b*. The lens barrel apparatus has a dual structure incorporating the intersecting cam grooves 11 and the linear-movement groove 15 forming a pair as shown in FIG. 2B. Thus, the cam followers 30*b* are supported at three or more points by the side walls of the dual structure. Thus, the movement of the cam followers 30*b* caused by the relative movement between the cam cylinder 1 and the linear-movement cylinder 1' does not result in any looseness of the cam followers 30*b* in the direction of the x-axis which is the direction of the movement and the direction of the y-axis perpendicular to the direction of the x-axis. Moreover, the cam followers 30*b* are able to maintain positions without any looseness at the stop position.

As described above, the first embodiment of the present invention is characterized in that the spiral cam grooves are formed in the surface of the cam cylinder 1. Moreover, the spring portions 20 are formed adjacent to the cam grooves in parallel with the same, the spring portions 20 having predetermined elongated openings formed by cutting for exhibiting predetermined elasticity.

The lens barrel apparatus for a camera having the above-mentioned structure is arranged such that a user rotates the cam cylinder 1 for locating the cam cylinder 1 on the optical axis to adjust the focal point. Thus, the operation force (e.g. external force) exerted from outside is converted into drive force owing to combination of the three cam grooves 11, the three cam followers 30*b* and the linear-movement grooves of fixed cylinders having linear-movement grooves (not shown).

In a period in which the external force for moving the lens is exerted, the three cam followers 30*b* are slid while the three cam followers 30*b* are being pressed against the two side walls of the three cam grooves 11. After the external force has been removed because of completion of the locating operation, the sliding movement is interrupted. The relationship of engagement (that is, the tight fit) with which the predetermined urging force is exerted on each of the three cam followers 30*b* engaged to the three cam grooves 11 causes the spring portions 20 serving as the spring means to always urge the cam followers by the reaction of the foregoing relationship. Therefore, the magnitude of the urging force is not changed and a state in which any gap (that is, looseness and rattling) is not formed can be maintained. As a result, the lens can always smoothly be moved.

As described above, according to the first embodiment, the lens barrel apparatus having the lens barrel called the "cam cylinder" serving as a so-called "rotative cylinder" has the frame member which can be operated even with a simple structure and which is free from any looseness.

First Modification

In the first embodiment, the three cam grooves are, as shown in the drawings, formed into spiral shapes and provided for the surface of the cam cylinder 1 such that the three cam grooves are formed apart from one another. The structure of the present invention is not limited to the three spiral cam grooves. The number and shape of the cam grooves may arbitrarily be determined. Moreover, the cam cylinder 1 may be constituted by any one of a variety of plate members such as a thin metal plate.

Second Embodiment

Figure 3:
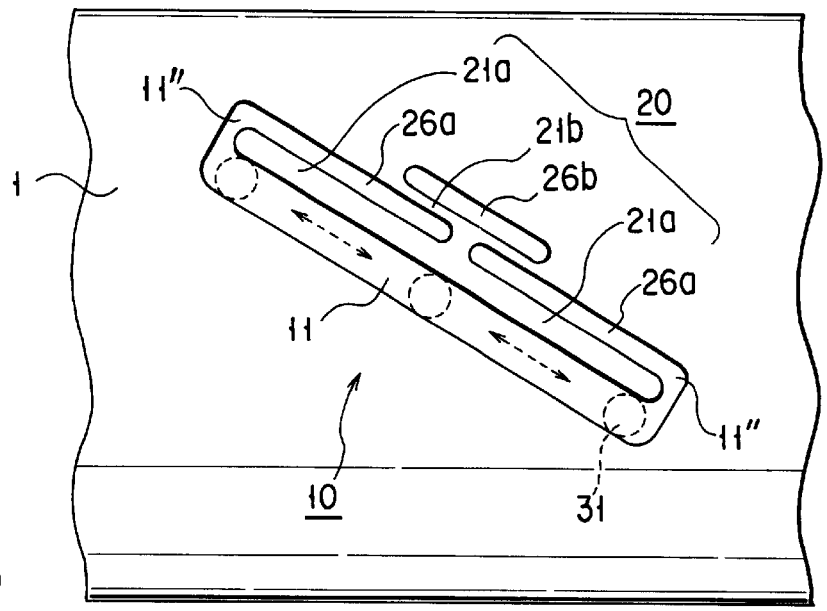
FIG. 3 is a developed plan view showing a cam cylinder according to a second embodiment of the present invention such that the cam portion and the spring portion are illustrated.

FIG. 3 shows a second embodiment which is a modification of the first embodiment such that the shape of one of the cam grooves 11 of the cam portion 10 provided for the cam cylinder 1 and first spring portion of the spring portions 20 are modified. FIG. 3 is a developed plan view showing one of the three spiral cam grooves 11 and a portion in the vicinity of the one cam groove.

As illustrated, the second embodiment is characterized by the shape of each of the two ends 11" of the cam groove 11. In the first embodiment, the cut portion (e.g. the two ends 11') extending from the cam groove 11 and structured to adjust elasticity is formed at each of the two ends of the cam groove 11. In the second embodiment, the two ends 11" of the cam groove 11 are continuously opened from the first openings 26*a* forming the spring portion 20. That is, the first openings 26*a* are continuously formed from the two ends 11" such that the first spring portions 21*a* are enclosed with the first openings 26*a*. Thus, the first spring portions 21*a* and 21*b* are formed in the inside portion, the two sides of which are enclosed.

Also the surface (not shown) of the cam cylinder 1 formed apart from the foregoing cam cylinder 1 by a phase difference of 120° has the other cam grooves 11 and the first spring portions 21*a* and 21*b*. Moreover, the other surface formed apart from the foregoing cam grooves 11 by a phase difference of 120° has the other cam grooves 11 and the first spring portions 21*a* and 21*b*.

As described above, also the cam structure according to the second embodiment incorporates the spiral cam grooves formed in the surface of the cam cylinder 1. The lens frame 30 having projecting cam followers arranged to be engaged to the cam grooves is slid along the cam grooves. Moreover, the shape is employed in which the two ends of the cam groove 1 are continued from the openings adjacent to the spring portion 20. Thus, the two ends 11" of the cam groove 11 are opened continuously from the adjacent openings, in particular the first openings 26a. The foregoing continuous openings impart appropriate deflection to, in particular, the two ends 11" of the first cam groove 11. Thus, balance between rigidity and elasticity is kept such that occurrence of any looseness can be prevented. As a result, the cam followers 30b can stably be held. Moreover, the shape of the opening including the cam grooves 11 can be integrated and simplified. Hence it follows that the machining process can easily and simply be performed.

Second Modification

A variety of modifications of the second embodiment may be structured by arbitrarily combining the cam grooves, the spring portions and the openings in a range satisfying the design requirements. As a matter of course, the dimensions and physical properties of the employed cam grooves must totally be considered when the positions and layout are designed. Thus, the spring force can be uniformed across the overall strokes of the cam grooves. As a result, an effect as well as or better than the effect obtainable from the first embodiment can be obtained.

Third Embodiment

A third embodiment of the present invention is characterized in that the cam grooves are so-called "linear-movement grooves". Note that the "linear-movement grooves" are linear grooves formed in parallel with the direction of the optical axis.

Figure 4:
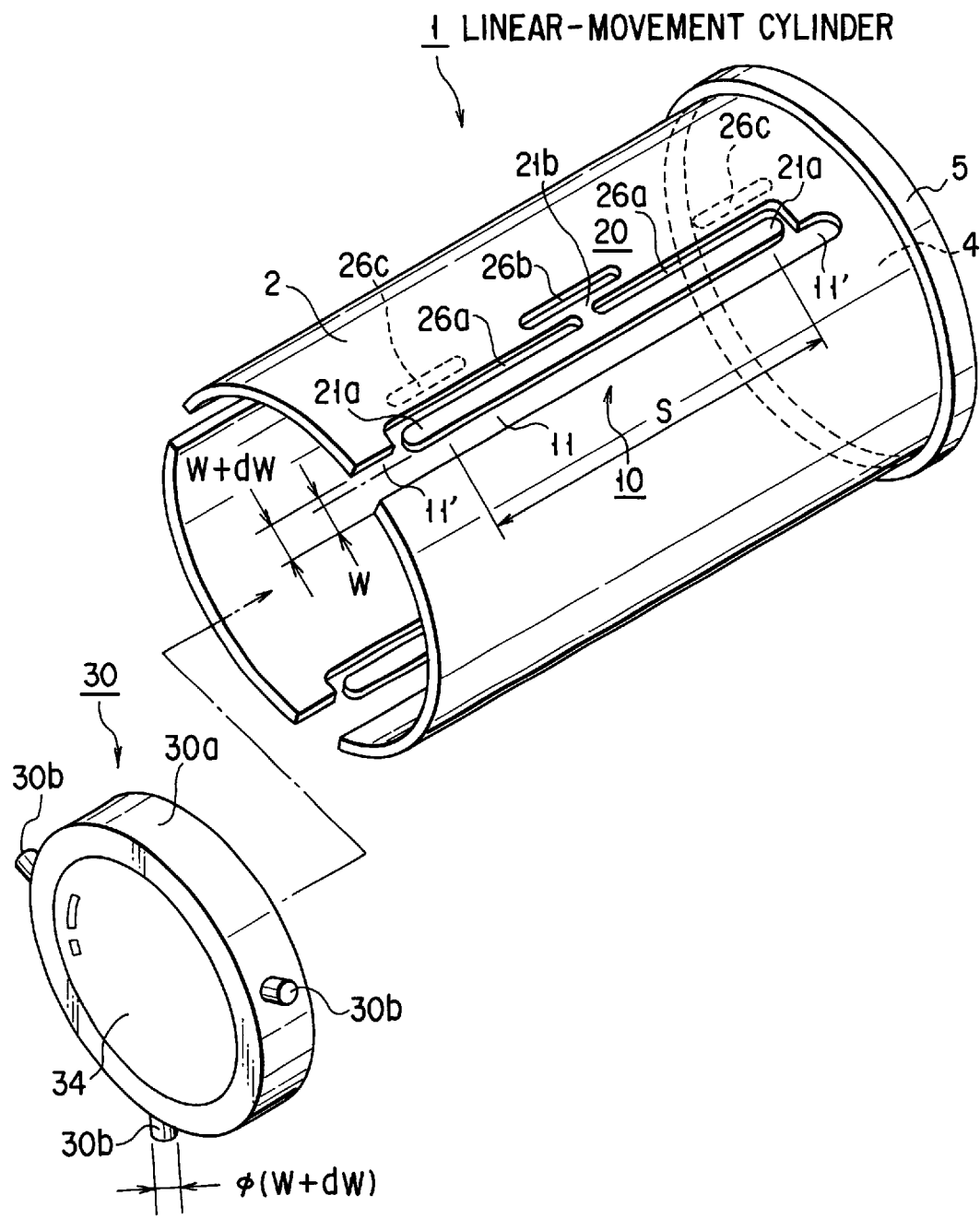
FIG. 4 is a perspective view showing a cam cylinder according to a third embodiment of the present invention such that a cam portion and a spring portion are illustrated.

FIG. 4 is a perspective view of the shape of a linear-movement cam cylinder (a linear-movement cylinder) 1' incorporating a cam portion 10 (three cam grooves) and the spring portions 20 adjacent to the cam portion 10 such that the shapes and positions of the cam portion 10 and the spring portions 20 are illustrated. That is, three pairs are provided each of which is constituted by the three cam grooves 11 constituting the cam portion 10 and the spring portion 20 adjacent to the three cam grooves 11. The three pairs are provided for the surface of the linear-movement cam cylinder 1' in parallel with the direction of the optical axis. The three pairs are formed apart from one another by the phase difference of 120° such that a relatively long stroke S can be realized.

One cam groove 11 of the cam portion 10 and a portion in the vicinity of the one cam groove 11 will now representatively be described. An end 11' of one cam groove 11 is attempted to be used to insert the cam follower 30b of the lens frame 30 such that the end 11' is formed continuously from the end of the linear-movement cam cylinder 1'. The other portions adjacent to the cam portion 10, for example, the spring portions 20 are formed similarly to those according to the second embodiment. The first openings 26a are formed continuously from the two ends 11' such that the first spring portions 21a are enclosed from the two sides. The inside portions each of which is enclosed from the two sides are provided with the first spring portions 21a. The other shapes except for the sizes, the lengths and the directions are similar to those according to the second embodiment.

The lens frame 30 incorporating the lens 34 is inserted from the opening formed at the end opposite to the opened surface 4 of the linear-movement cam cylinder 1'. The lens frame 30 is inserted in the direction of the optical axis as indicated with an arrow while the lens frame 30 is being slid with respect to the three cam followers 30b. The lens frame 30 is supported by the cam grooves 11. Also the relationship between the diameter of each of the three cam followers 30b and the width (W) of each of the three cam grooves 11 is established such that the diameter is the same as the width or slightly larger by dW (for example, dW=0.01 mm to 0.005 mm). Therefore, the foregoing difference permits the cam followers 30b and the cam grooves 11 to be joined such that sliding is performed in such a manner that the hermetic contact is always established.

The foregoing structure of the third embodiment permits the lens frame 30 to perform parallel translation in the direction of the optical axis along the cam grooves 11 through the cam followers 30b. When the parallel translation is performed, a predetermined spring characteristic imparted from the spring portions 20 enables hermetic contact across the overall stroke S to be maintained. Also in a stop state, the lens frame 30 can stably be held owing to the elasticity.

As a result, the lens barrel apparatus incorporating the lens barrel serving as the "linear-movement cylinder" can be manufactured by using a small number of simple elements and a simple manufacturing and assembling steps.

Note that the linear-movement cam cylinder according to the third embodiment incorporates a cam cylinder (not shown) which is rotated with respect to the outer surface of the linear-movement cam cylinder to move the lens frame 30 in the direction of the optical axis. In this case, the cam followers are fitted to the cam grooves of the cam cylinder (not shown). Moreover, the cam followers are as well as fitted to the cam grooves of the foregoing linear-movement cam cylinder. The width of each cam groove of the cam cylinder (not shown) may be a usual width. That is, even a cam groove having a width slightly larger than the diameter of the cam follower is able to prevent looseness of the lens frame 30 occurring in the direction of the optical axis because the cam followers are held in the cam grooves of the linear-movement cam cylinder owing to the spring characteristic.

Third Modification

To adjust the elasticity of each of the spring portions 20, a spare opening 26c formed, for example, as indicated with a dashed line shown in FIG. 4 having an appropriate size may be formed at an arbitrary position to enable an optimum spring characteristic to be exhibited. As an alternative to this, the opened end 5 may have a large thickness to increase the rigidity of the opening.

Fourth Embodiment

Figure 5:
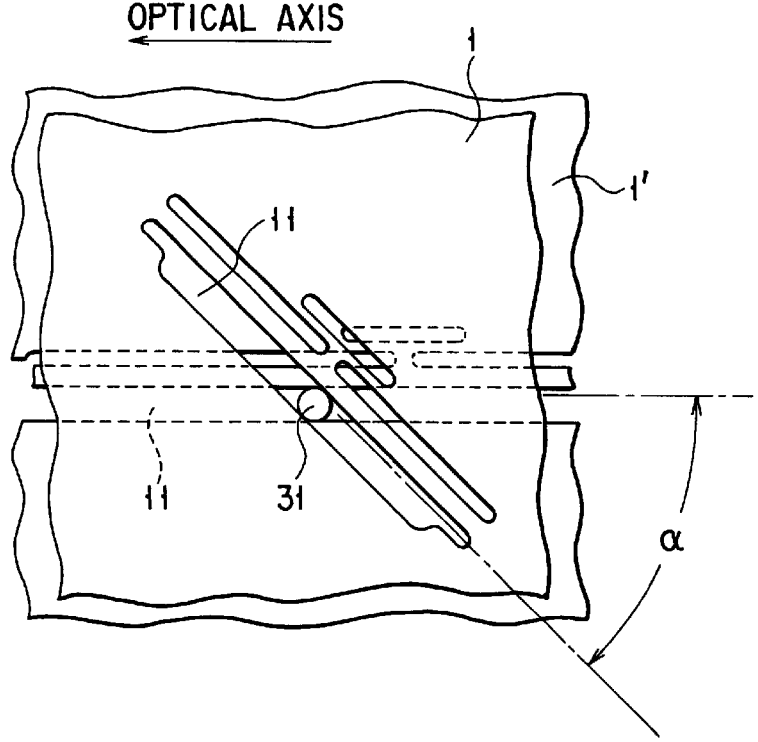
FIG. 5 is a developed plan view showing a structure formed by combining the cam cylinders according to the first and third embodiments.

A cam structure according to the following fourth embodiment is characterized by a dual structure formed by combining the spiral grooves according to the first embodiment and the linear-movement grooves according to the third embodiment. FIG. 5 is a developed plan view of the cam cylinder according to the fourth embodiment. As shown in FIG. 5, the fourth embodiment has a structure that two cam cylinders having cam grooves extending in different directions are integrally overlaid to form one lens barrel apparatus.

That is, the lens barrel apparatus according to this embodiment incorporates a linear-movement cam cylinder 1' serving as a first frame member which is the first cam means according to the third embodiment and having the linear-movement grooves. Moreover, the lens barrel apparatus incorporates a cam cylinder 1 which is a second frame member serving as the second cam means according to the first embodiment which is overlaid on the linear-movement cam cylinder 1' and incorporating spiral grooves. As shown in FIG. 5, the two cam grooves 11 intersect such that an angle α is made. While the cam followers 30b are penetrating the two cam grooves and engaging to the same, the relative movement of the two cam grooves 11 is performed to permit movement of the lens frame 30 (not shown) supported by the cam followers 30b and serving as the third frame member in the direction of the optical axis.

In general, the conventional combination of one pair of cam cylinders having no spring characteristic has a structure that the cam followers arranged to be engaged to the two intersecting cam grooves are in contact with at least two positions of the cam grooves. When the cam followers are moved in one direction, any looseness does not occur. When reverse movement is performed by changing the direction of movement, looseness easily occurs owing to a backlash.

On the other hand, the combination of the two cam cylinders according to the fourth embodiment each having the spring characteristic is structured such that the two cam grooves arranged to be engaged to the cam followers are brought into contact with the cam followers at four points thereof. Moreover, the two cam grooves reliably hold the cam followers owing to the spring characteristic. Therefore, the relative movement of the two cam grooves does not cause any looseness between the cam grooves and the cam followers. Hence it follows that the lens frame 30 is able to smoothly move in the direction of the optical axis. When the reverse movement is performed, the "four-point support" is able to prevent occurrence of the backlash. The foregoing state of holding can be maintained at an arbitrary stop position. Therefore, a state free from looseness of the cam followers can be maintained. As a result, the lens barrel apparatus which is capable of accurately locating the position of the lens frame 30 can be provided.

Another Modification

The present invention is not limited to the foregoing embodiments. For example, the spirit disclosed in each embodiment may be applied to a camera of another type. As an alternative to the described cam mechanism, free combination with another mechanism with which a similar operation and effect can be obtained is permitted. As a matter of course, it is preferable that a simple mechanism which can simply be operated is employed.

The present disclosure of the preferred form can be changed in the details of construction and in the combination and arrangement of parts without departing from the spirit and the scope of the invention.

As described above, according to the present invention, the lens barrel apparatus can be provided which incorporates a cam mechanism having the cams and the cam followers each having a simple structure, requiring a small number of elements and capable of preventing occurrence of looseness so that the position is maintained in a state in which occurrence of any looseness can be prevented.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A lens barrel apparatus comprising:
   a cam cylinder having cam grooves for moving cam followers; and
   spring portions formed to make predetermined holding force to cause the cam grooves to pinch the cam followers and formed adjacent to the cam grooves;
   wherein the cam grooves are continuous grooves or openings formed in the cam cylinder, and the spring portions are constituted by a plurality of openings formed adjacent to the cam grooves.

2. The lens barrel apparatus according to claim 1, wherein each of the cam grooves has a region in which each of the cam followers is moved and an extending portion extending from each of two ends of the region.

3. The lens barrel apparatus according to claim 2, wherein the extending portion has a width smaller than the width of the cam groove.

4. A lens barrel apparatus comprising:
   a movable frame having cam followers;
   a frame member incorporating cam grooves arranged to be engaged to the cam followers to move the movable frame and structured such that the cam followers and the cam grooves are relatively moved without occurrence of any gap or looseness; and
   elastic portions formed integrally with the frame member and arranged to cause the cam followers to slide along one side wall of the cam groove.

5. The lens barrel apparatus according to claim 4, wherein elasticity is imparted to the elastic portion owing to a plurality of openings formed adjacent to the cam groove.

6. The lens barrel apparatus according to claim 5, wherein the plural openings comprises:
   a first opening formed substantially in parallel with the cam groove from a position adjacent to a start position of the cam groove to a position adjacent to an intermediate position of the cam groove;
   a second opening formed substantially in parallel with the cam groove from a position adjacent to the intermediate position apart from the first opening to a position adjacent to an end of the cam groove; and
   a third opening formed at a position apart from the cam groove as compared with the first and second openings such that the third opening is formed across the first opening and the second opening in a direction in which the openings.

7. A lens barrel apparatus according to claim 6, wherein the first opening is connected to the cam groove at a position adjacent to the start point of the cam groove, and the second opening is connected to the cam groove at a position adjacent to an end of the cam groove.

8. A lens barrel apparatus comprising:
   a first frame member having first cam means structured to be capable of causing a cam follower to slidably be engaged and holding the cam follower without any gap;
   a second frame member having second cam means structured to be capable of causing the cam follower to slidably be engaged and holding the cam follower without any gap; and
   a third frame member having the cam follower;
   wherein the third frame member is moved by fitting the cam follower to the first and second cam means to relatively move the first and second frame members.

9. The lens barrel apparatus according to claim 8, wherein a spring portion for causing the cam follower to be brought into contact with one side surface of the cam groove of each of the first and second frame members is integrally formed with each of the first and second frame members.

10. The lens barrel apparatus according to claim 9, wherein the spring portion is constituted by a plurality of opening formed adjacent to the cam groove.

11. A lens barrel apparatus comprising:
   a holding frame for holding a lens;
   a frame member for moving the holding frame in the direction of the optical axis; and a spring portion formed integrally with the frame member to urge the holding frame.

12. The lens barrel apparatus according to claim 11, further comprising:

a cam follower provided for the holding frame;

a cam surface arranged to be engaged to the cam follower, the cam surface being provided for the frame member;

wherein the spring portion imparts urging force for bringing the cam follower into contact with the cam surface.

13. The lens barrel apparatus according to claim 12, wherein the frame member incorporates an opening formed substantially in parallel with the cam surface so that elasticity is imparted from the opening to the spring portion.

14. The lens barrel apparatus according to claim 12, further comprising:

cam followers formed at three positions around the holding frame at substantially the same intervals; and three cam grooves formed at positions corresponding to the cam followers.

15. A lens barrel apparatus comprising:

a holding frame for holding a lens;

a cam follower provided for the holding frame;

a frame member having a cam groove arranged to be engaged to the cam follower;

wherein the cam follower and the cam groove are characterized in that;

the width of the cam groove is smaller than the width of the cam follower before the holding frame the frame member are combined with each other, and either side wall of the cam groove is elastically deformed in a state where the holding frame and the frame member have been combined with each other so that elastic force causes the cam follower to be brought into contact with another wall of the cam groove.

16. The lens barrel apparatus according to claim 15, wherein the frame member is characterized in that;

the frame member incorporates a first opening formed substantially in parallel with the cam groove provided for the frame member, a second opening formed substantially in parallel with a direction in which the first opening and the cam groove are extended, having substantially the same length and provided substantially in parallel with the cam groove at a position apart from the cam groove in the direction in which the cam groove is extended; and a third opening formed at a position apart from the cam groove as compared with the first and second opening in a direction substantially perpendicular to the direction in which the cam groove is extended and between the first and second openings in the direction in which the cam groove is extended.

17. A lens barrel apparatus comprising:

a first frame member incorporating a cam follower;

a second frame member incorporating a cam groove which is arranged to be engaged to the cam follower and which has a pair of walls integrally formed with the second frame member to move the first frame member;

wherein either of the walls forming the pair incorporates an electric portion for pressing the cam follower against another wall so that the cam follower and the cam groove are moved without occurrence of any gap or looseness.

18. The lens barrel apparatus according to claim 17, wherein elasticity is imparted to the elastic portion owing to a plurality of openings formed substantially in parallel with the cam groove.

* * * * *

UNITED STATES PATENT AND TRADEMARK OFFICE
CERTIFICATE OF CORRECTION

PATENT NO.   : 6,317,273
DATED        : November 13, 2001
INVENTOR(S)  : Tatsuo Takanashi It is certified that error appears in the above-identified patent and that said Letters Patent is hereby corrected as shown below:

<u>Title page,</u>
Item [73], Assignee:, after "Olympus" insert -- Optical --.

Signed and Sealed this

Twenty-seventh Day of August, 2002

Attest:

JAMES E. ROGAN
Attesting Officer    Director of the United States Patent and Trademark Office